(12) United States Patent
Okada

(10) Patent No.: US 10,562,497 B2
(45) Date of Patent: *Feb. 18, 2020

(54) CONTROL SYSTEM FOR VEHICLE

(71) Applicant: TOYOTA JIDOSHA KABUSHIKI KAISHA, Toyota-shi, Aichi-ken (JP)

(72) Inventor: Hiroki Okada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/373,045

(22) Filed: Apr. 2, 2019

(65) Prior Publication Data
US 2019/0241156 A1 Aug. 8, 2019

Related U.S. Application Data

(63) Continuation of application No. 16/041,105, filed on Jul. 20, 2018, now Pat. No. 10,293,788.

(30) Foreign Application Priority Data

Aug. 16, 2017 (JP) ................................. 2017-157110

(51) Int. Cl.
*B60R 25/24* (2013.01)
*H04W 4/40* (2018.01)
(Continued)

(52) U.S. Cl.
CPC ............ *B60R 25/245* (2013.01); *B60R 25/31* (2013.01); *G01S 11/14* (2013.01); *H04W 4/40* (2018.02); *H04W 12/06* (2013.01)

(58) Field of Classification Search
CPC . B60R 25/1004; B60R 25/243; B60R 25/245; B60R 25/24; B60R 25/01;
(Continued)

(56) References Cited

U.S. PATENT DOCUMENTS 6,218,932 B1 4/2001 Stippler
9,855,918 B1 * 1/2018 Melaragni ............... B60R 25/01
(Continued)

FOREIGN PATENT DOCUMENTS

DE 19836957 C1 9/1999
DE 102010054593 A1 12/2011
(Continued)

*Primary Examiner* — Hoi C Lau
(74) *Attorney, Agent, or Firm* — Oliff PLC (57) ABSTRACT

A control system for a vehicle includes a portable authentication terminal configured to authenticate a user who carries the portable authentication terminal, and a vehicle configured to communicate with the portable authentication terminal. The vehicle includes a sound generation unit configured to generate a predetermined sound within a vehicle cabin, an information reception unit configured to receive information transmitted from the portable authentication terminal, and a determination unit configured to determine whether the portable authentication terminal is within the cabin based on the received information. The portable authentication terminal includes a sound collection unit configured to collect a sound, and an information transmission unit configured to transmit information based on the collected sound to the vehicle. The determination unit is configured to determine whether the portable authentication terminal is within the cabin based on whether the received information is information based on the sound generated by the sound generation unit.

14 Claims, 6 Drawing Sheets

(51) Int. Cl.
*B60R 25/31* (2013.01)
*H04W 12/06* (2009.01)
*G01S 11/14* (2006.01)

(58) Field of Classification Search
CPC .............. G01C 21/26; G01C 21/3632; G01C 21/3664; G07C 9/00119; G07C 9/00015; G07C 9/00111
See application file for complete search history.

(56) References Cited

U.S. PATENT DOCUMENTS

| | | | |
|---|---|---|---|
| 2006/0125600 A1 | 6/2006 | Brillon | |
| 2008/0059806 A1* | 3/2008 | Kishida | G06F 21/35 713/186 |
| 2009/0189746 A1* | 7/2009 | Ullrich | A61B 5/0002 340/407.1 |
| 2010/0231465 A1 | 9/2010 | Tanaka | |
| 2011/0148573 A1* | 6/2011 | Ghabra | B60R 25/245 340/5.61 |
| 2013/0041560 A1* | 2/2013 | Bongiorno | B60R 25/24 701/48 |
| 2013/0190978 A1* | 7/2013 | Kato | G01C 21/3664 701/36 |
| 2014/0114504 A1* | 4/2014 | Yamashita | B60R 25/40 701/2 |
| 2014/0333425 A1* | 11/2014 | Giraud | G07C 5/008 340/438 |
| 2014/0369169 A1 | 12/2014 | Iida et al. | |
| 2015/0015479 A1* | 1/2015 | Cho | G06F 3/013 345/156 |
| 2015/0356797 A1* | 12/2015 | McBride | G07C 9/00119 340/5.61 |
| 2015/0363986 A1* | 12/2015 | Hoyos | H05K 999/99 340/5.61 |
| 2016/0061613 A1* | 3/2016 | Jung | G01C 21/3632 701/49 |
| 2016/0063784 A1* | 3/2016 | Murakami | G07C 9/00309 340/5.61 |
| 2016/0107611 A1* | 4/2016 | Siswick | H04L 67/125 340/425.5 |
| 2016/0114745 A1* | 4/2016 | Ricci | H04W 12/06 701/2 |
| 2016/0169683 A1* | 6/2016 | Lynch | G01C 21/26 701/409 |
| 2016/0202697 A1 | 7/2016 | Matsumoto et al. | |
| 2017/0021805 A1 | 1/2017 | Haupt et al. | |
| 2017/0103592 A1* | 4/2017 | Buttolo | G07C 9/00015 |
| 2017/0151928 A1* | 6/2017 | Kang | B60R 25/04 |
| 2017/0151929 A1* | 6/2017 | Lee | B60R 25/022 |
| 2017/0200334 A1* | 7/2017 | Buttolo | B60R 25/24 |
| 2017/0238174 A1* | 8/2017 | Cech | H04W 4/80 455/411 |
| 2017/0249791 A1* | 8/2017 | Woo | G07C 9/00111 |
| 2018/0022314 A1* | 1/2018 | Ji | B60R 25/24 340/5.61 |
| 2018/0105137 A1* | 4/2018 | Kawamura | B60R 25/243 |
| 2018/0290627 A1* | 10/2018 | Hariri | B60R 25/245 |

FOREIGN PATENT DOCUMENTS

| | | |
|---|---|---|
| EP | 3 121 068 A1 | 1/2017 |
| FR | 2877903 A1 | 5/2006 |
| JP | 2003-120097 A | 4/2003 |
| JP | 2006-276605 A | 10/2006 |
| JP | 2010-086328 A | 4/2010 |

* cited by examiner

CONTROL SYSTEM FOR VEHICLE

CROSS REFERENCE TO RELATED APPLICATIONS

This is a Continuation of application Ser. No. 16/041,105 filed Jul. 20, 2018, which claims the benefit of Japanese Patent Application No. 2017-157110 filed Aug. 16, 2017. The disclosure of the prior applications including the specification, drawings and abstract is incorporated herein by reference in their entireties.

BACKGROUND

1. Technical Field

The present disclosure relates to a control system for a vehicle that is mounted in the vehicle.

2. Description of Related Art

For example, Japanese Unexamined Patent Application Publication No. 2003-120097 (JP 2003-120097 A) discloses a control system for a vehicle in which a portable terminal (hereinafter, referred to as a "portable authentication terminal") with an authentication function carried with an authorized user other than an electronic key dedicated to the vehicle performs authentication with the vehicle, thereby enabling execution of various vehicle operations.

SUMMARY

As the vehicle operations, an operation such as engine start that is permitted solely when a portable authentication terminal authenticated (or to be authenticated) by the vehicle is within the vehicle cabin is known. For this reason, in a case where the vehicle operation described above is requested from a user, in the control system for a vehicle, there is a need to determine whether or not the portable authentication terminal is within the vehicle cabin when the vehicle authenticates the portable authentication terminal.

However, the control system for a vehicle may hardly determine whether or not the portable authentication terminal is within the vehicle cabin with high accuracy depending on a communication system, an interface, or the like mounted in the portable authentication terminal, unlike the electronic key dedicated to the vehicle.

The disclosure provides a control system for a vehicle capable of determining whether or not a portable authentication terminal is within a vehicle cabin with high accuracy.

A first aspect of the disclosure relates to a control system for a vehicle. The control system includes a portable authentication terminal configured to be able to authenticate a user who carries the portable authentication terminal, and a vehicle configured to communicate with the portable authentication terminal. The vehicle includes a sound generation unit configured to generate a predetermined sound within a vehicle cabin, an information reception unit configured to receive information transmitted from the portable authentication terminal, and a determination unit configured to determine whether or not the portable authentication terminal is within the vehicle cabin based on the information received by the information reception unit. The portable authentication terminal includes a sound collection unit configured to collect a sound, and an information transmission unit configured to transmit information based on the sound collected by the sound collection unit to the vehicle. The determination unit is configured to determine whether or not the portable authentication terminal is within the vehicle cabin based on whether or not the information received by the information reception unit is information based on the sound generated by the sound generation unit.

In the first aspect of the disclosure, the predetermined sound is generated within the vehicle cabin on the vehicle side, and in a case where the portable authentication terminal can capture the predetermined sound, determination is made that the portable authentication terminal is within the vehicle cabin. According to the first aspect of the disclosure, it is possible to determine whether or not the portable authentication terminal is within the vehicle cabin with high accuracy.

In the control system according to the first aspect of the disclosure, the sound generation unit may be configured to generate a sound of a predetermined pattern within the vehicle cabin. The determination unit may be configured to determine whether or not the information received by the information reception unit corresponds to the predetermined pattern to determine whether or not the portable authentication terminal is within the vehicle cabin.

In the first aspect of the disclosure, since the sound of the predetermined pattern is exchanged between the vehicle and the portable authentication terminal, it is possible to determine whether or not the portable authentication terminal is within the vehicle cabin with higher accuracy compared to a case where a sound with no pattern is exchanged.

In the control system according to the first aspect of the disclosure, the determination unit may be configured to, in a case where the information received by the information reception unit corresponds to the predetermined pattern, determine that the portable authentication terminal is within the vehicle cabin, and in a case where the information received by the information reception unit does not correspond to the predetermined pattern, determine that the portable authentication terminal is outside the vehicle cabin.

In the control system according to the first aspect of the disclosure, the sound generation unit may be configured to generate a plurality of sounds having different characteristics. The determination unit may be configured to determine whether or not the information received by the information reception unit corresponds to the sounds to determine whether or not the portable authentication terminal is within the vehicle cabin.

In the first aspect of the disclosure, since determination is made whether or not the portable authentication terminal is within the vehicle cabin using the sounds between the vehicle and the portable authentication terminal, it is possible to determine whether or not the portable authentication terminal is within the vehicle cabin with higher accuracy compared to a case where a single sound is used.

In the control system according to the first aspect of the disclosure, the sounds may be different in one of sound intensity and frequency.

In the control system according to the first aspect of the disclosure, the portable authentication terminal may be a wearable device that is mounted in an earhole of the user.

In the control system according to the first aspect of the disclosure, the portable authentication terminal may be a wearable device that is mounted on a wrist of the user.

In the control system according to the first aspect of the disclosure, at least a part of the sound generation unit, the information reception unit, and the determination unit may be constituted by an electronic control unit.

A second aspect of the disclosure relates to a control system for a vehicle. The control system includes a portable authentication terminal configured to be able to authenticate a user who carries the portable authentication terminal, and a vehicle configured to communicate with the portable authentication terminal. The vehicle includes a magnetic field generation unit configured to generate a predetermined magnetic field within a vehicle cabin, an information reception unit configured to receive information transmitted from the portable authentication terminal, and a determination unit configured to determine whether or not the portable authentication terminal is within the vehicle cabin based on the information received by the information reception unit. The portable authentication terminal includes a magnetic field detection unit configured to detect a magnetic field, and an information transmission unit configured to transmit information based on the magnetic field detected by the magnetic field detection unit to the vehicle. The determination unit is configured to determine whether or not the portable authentication terminal is within the vehicle cabin based on whether or not the information received by the information reception unit is information based on the magnetic field generated by the magnetic field generation unit.

In the second aspect of the disclosure, the predetermined magnetic field is generated within the vehicle cabin on the vehicle side, and in a case where the portable authentication terminal can detect the predetermined magnetic field, determination is made that the portable authentication terminal is within the vehicle cabin. According to the second aspect of the disclosure, it is possible to determine whether or not the portable authentication terminal is within the vehicle cabin with high accuracy.

In the control system according to the second aspect of the disclosure, the magnetic field generation unit may be configured to generate a magnetic field of a predetermined pattern. The determination unit may be configured to determine whether or not the information received by the information reception unit corresponds to the predetermined pattern to determine whether or not the portable authentication terminal is within the vehicle cabin.

In the second aspect of the disclosure, since the magnetic field of the predetermined pattern is determined between the vehicle and the portable authentication terminal, it is possible to determine whether or not the portable authentication terminal is within the vehicle cabin with higher accuracy compared to a case where a magnetic field with no pattern is determined.

In the control system according to the second aspect of the disclosure, the determination unit may be configured to, in a case where the information received by the information reception unit corresponds to the predetermined pattern, determine that the portable authentication terminal is within the vehicle cabin, and in a case where the information received by the information reception unit does not correspond to the predetermined pattern, determine that the portable authentication terminal is outside the vehicle cabin.

In the control system according to the second aspect of the disclosure, the determination unit may have a magnetic field map within the vehicle cabin, the magnetic field map relating to the magnetic field generated by the magnetic field generation unit, and the determination unit may be configured to determine whether or not the portable authentication terminal is within the vehicle cabin based on the information received by the information reception unit and the magnetic field map.

In the second aspect of the disclosure, since determination is made whether or not the portable authentication terminal is within the vehicle cabin using the magnetic field map between the vehicle and the portable authentication terminal, it is possible to determine whether or not the portable authentication terminal is within the vehicle cabin with higher accuracy compared to a case where a magnetic field map is not used.

In the control system according to the second aspect of the disclosure, the magnetic field generation unit may be mounted on a pillar part of the vehicle.

In the control system according to the second aspect of the disclosure, the portable authentication terminal may be a wearable device that is mounted in an earhole of the user or a wearable device that is mounted on a wrist of the user.

In the wearable device described above, since it is possible to authenticate the user who wears the wearable device with high accuracy, in a case where the user is registered as an operation right holder of the vehicle in advance, it is possible to realize secure authentication through the portable authentication terminal.

In the control system according to the second aspect of the disclosure, at least a part of the magnetic field generation unit, the information reception unit, and the determination unit may be constituted by an electronic control unit.

With the control system for a vehicle according to the first and second aspects of the disclosure, it is possible to determine whether or not the portable authentication terminal is within the vehicle cabin with high accuracy.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Outline

The disclosure relates to a control system for a vehicle. The control system includes a portable authentication terminal that is able to authenticate a user who carries the portable authentication terminal, and a vehicle that communicates with the portable authentication terminal. In the control system for a vehicle, a predetermined sound or magnetic field is generated within a vehicle cabin on the vehicle side, and in a case where the portable authentication terminal can capture the predetermined sound or magnetic field, determination is made that the portable authentication terminal is within the vehicle cabin. With this, it is possible to determine whether or not the portable authentication terminal is within the vehicle cabin with high accuracy.

Outline of Control System for Vehicle

Figure 1:
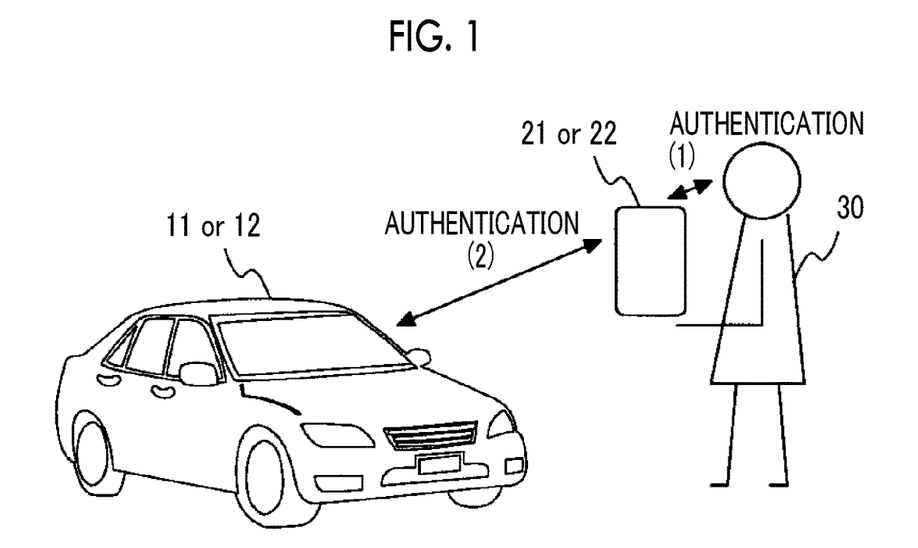
FIG. 1 is a diagram illustrating the outline of a control system for a vehicle according to an embodiment.

FIG. 1 is a diagram illustrating the outline of a control system for a vehicle according to an embodiment. The control system for a vehicle shown in FIG. 1 includes a vehicle 11 or 12, and a portable authentication terminal 21 or 22 that is carried with or mounted on a right holder (hereinafter, referred to as a "user") 30 who can perform an operation of the vehicle 11 or 12.

In the control system for a vehicle, the portable authentication terminal 21 or 22 performs authentication processing for determining whether or not the user 30 who carries and wears the portable authentication terminal 21 or 22 is a right holder (registered in advance) that can perform an operation of the portable authentication terminal 21 or 22 (authentication (1) of FIG. 1). In the authentication processing, authentication processing using, for example, biological information (fingerprint, voiceprint, retina, earhole, vein, or the like) can be used. When the user 30 performs a vehicle operation, authentication processing for determining whether or not the portable authentication terminal 21 or 22 is authorized equipment (registered in advance) is performed between the vehicle 11 or 12 and the portable authentication terminal 21 or 22 (authentication (2) of FIG. 1).

As described above, in the control system for a vehicle, when the user 30 is about to operate the vehicle, since authentication is performed twice by the portable authentication terminal 21 or 22 and the vehicle 11 or 12, it is possible to perform authentication with high security compared to a case where a vehicle operation is performed using an electronic key dedicated to the vehicle. As described in Description of Related Art, in order to further ensure authentication with high security, there is a need to determine the position of the portable authentication terminal 21 or 22 with high accuracy like the electronic key dedicated to the vehicle.

In the control system for a vehicle, when the user performs a vehicle operation, that is, when the authentication processing (authentication (2) of FIG. 1) is performed between the portable authentication terminal 21 or 22 and the vehicle 11 or 12, the vehicle 11 or 12 determines the position of the portable authentication terminal 21 or 22, and specifically, whether the portable authentication terminal 21 or 22 is within the vehicle cabin or outside the vehicle cabin with high accuracy. Hereinafter, a method of determining whether or not the portable authentication terminal 21 or 22 is within the vehicle cabin with high accuracy will be described.

First Embodiment

Figure 2:
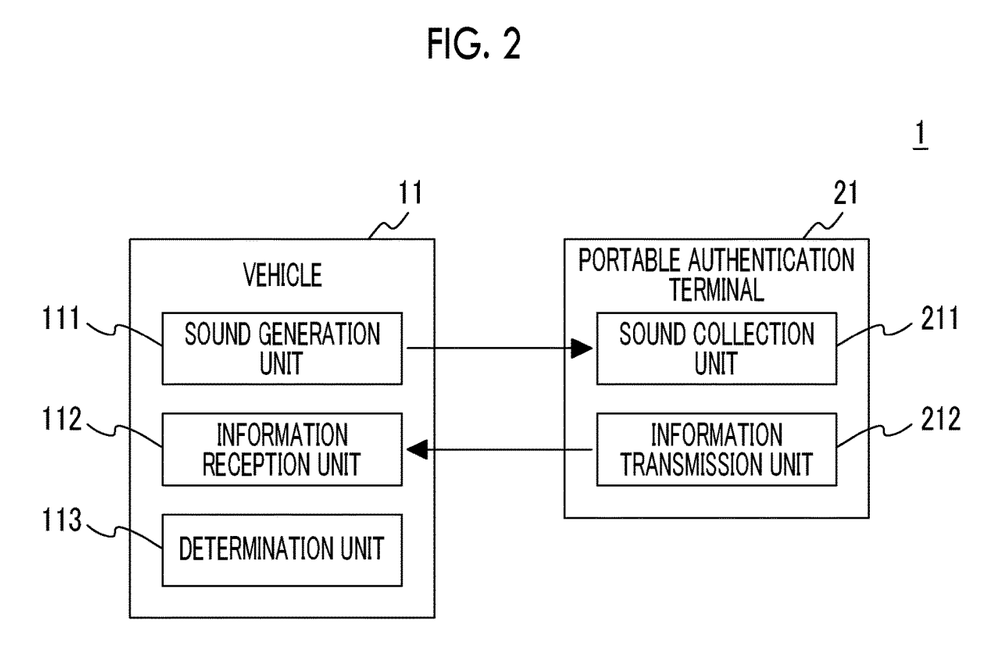
FIG. 2 is a diagram showing the configuration of a control system for a vehicle according to a first embodiment.

FIG. 2 is a diagram showing the configuration of control system 1 for a vehicle according to a first embodiment. The control system 1 for a vehicle shown in FIG. 2 includes a sound generation unit 111, an information reception unit 112, and a determination unit 113 provided in the vehicle 11, and a sound collection unit 211 and an information transmission unit 212 provided in the portable authentication terminal 21.

Configuration of Vehicle

Figure 3:
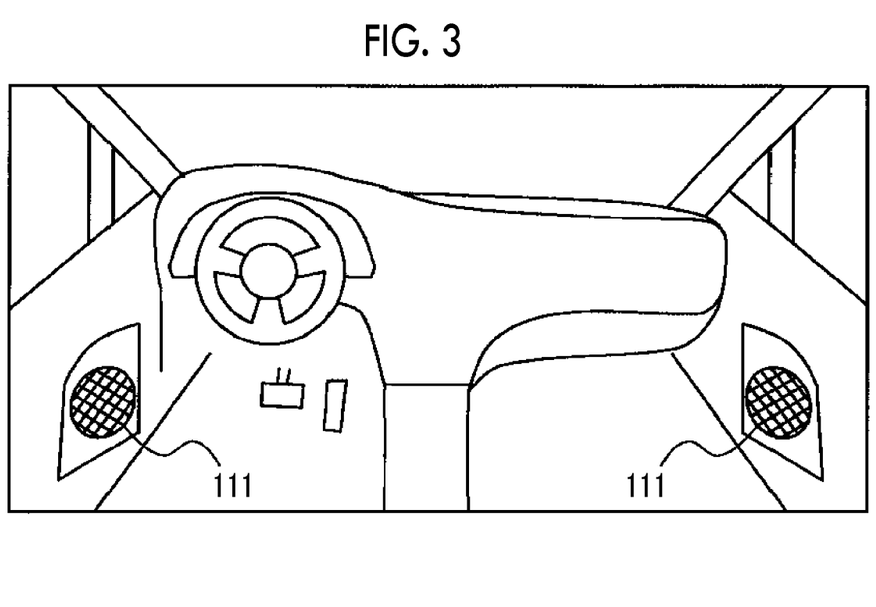
FIG. 3 shows an installation example of a sound generation unit within a vehicle cabin of the vehicle.

The sound generation unit 111 can generate a predetermined sound within the vehicle cabin of the vehicle 11. For the sound generation unit 111, for example, as shown in FIG. 3, a speaker device or the like that is mounted in the vehicle 11 (in advance or newly) can be used. The sound that is generated from the sound generation unit 111 may be an audible sound or an inaudible sound, such as an ultrasonic wave as long as a sound wave can be captured by the sound collection unit 211 of the portable authentication terminal 21 described below. The generation of the predetermined sound may be performed solely for a predetermined time, or may be continuously performed until the authentication of the portable authentication terminal 21 ends in the vehicle 11.

The sound generation unit 111 is configured to be able to generate a sound of a predetermined pattern determined in advance. A pattern is represented by, for example, change in strength of sound, interval of sound, or frequency of sound. The sound generation unit 111 can be configured to be able to superimpose a predetermined encoded signal on a sound to be generated. The sound generation unit 111 may be configured to be able to generate a plurality of sounds having different characteristics. The sounds are considered to be different in, for example, one of sound intensity and frequency.

The information reception unit 112 can receive predetermined information transmitted from the information transmission unit 212 of the portable authentication terminal 21 described below. In regard to the reception, the same communication system as a communication system to be used for information transmission in the portable authentication terminal 21 described below can be used.

The determination unit 113 determines whether or not the portable authentication terminal 21 is within the vehicle cabin based on information received by the information reception unit 112. Specifically, the determination unit 113 determines that the portable authentication terminal 21 is within the vehicle cabin in a case where the information received by the information reception unit 112 is information based on the sound generated by the sound generation unit 111. The determination unit 113 determines that the portable authentication terminal 21 is outside the vehicle cabin in a case where the information received by the information reception unit 112 is information other than the information based on the sound generated by the sound generation unit 111. For example, in a case where the information received by the information reception unit 112 is a sound, determination can be made whether or not the sound coincides with the sound generated by the sound generation unit 111.

For example, in a case where the sound generation unit 111 generates the sound of the predetermined pattern, the determination unit 113 determines whether or not the information received by the information reception unit 112 corresponds to the pattern. The determination unit 113 determines that the portable authentication terminal 21 is within the vehicle cabin in a case where the information received by the information reception unit 112 corresponds to the pattern, and determines that the portable authentication terminal 21 is outside the vehicle cabin in a case where the information received by the information reception unit 112 does not correspond to the pattern.

For example, in a case where the predetermined encoded (encrypted) signal is superimposed on the sound generated by the sound generation unit 111, the determination unit 113 determines whether or not the encoded signal or an encoded signal subjected to an algorithm operation is superimposed on the information received by the information reception unit 112. The determination unit 113 determines that the portable authentication terminal 21 is within the vehicle cabin in a case where the encoded signal is superimposed on the information received by the information reception unit 112, and determines that the portable authentication terminal 21 is outside the vehicle cabin in a case where the encoded signal is not superimposed on the information received by the information reception unit 112. An algorithm for an arithmetic operation of the encoded signal may be agreed in advance with the portable authentication terminal 21.

For example, in a case where the sound generation unit 111 generates the sounds, the determination unit 113 can analyze a difference or the like in strength or arrival time of sound obtained from the information received by the information reception unit 112, and can determine a position where the portable authentication terminal 21 is within the vehicle cabin in detail. For example, in a case of information that a first sound generated from a speaker device on a driver's seat side is stronger than a second sound generated from a speaker device on a passenger's seat side, the determination unit 113 may determine that the portable authentication terminal 21 is on the driver's seat side, and may provide an additional service limited to the driver's seat.

A part of the sound generation unit 111, the information reception unit 112, and the determination unit 113 described above can be typically constituted as an electronic control unit (ECU) including a central processing unit (CPU), a memory, an input/output interface, and the like. In the electronic control unit, the CPU reads and executes a predetermined program stored in the memory, whereby a predetermined function is realized.

Configuration of Portable Authentication Terminal

The sound collection unit 211 can capture and collect a sound around the portable authentication terminal 21. A frequency of the predetermined sound generated by the sound generation unit 111 of the vehicle 11 is also included in a frequency range of a collectable sound. For the sound collection unit 211, for example, an interface, such as a microphone, can be used. The sound collection unit 211 generates information based on the collected sound.

The information based on the collected sound may be, for example, the collected sound itself. In a case where the collected sound has a pattern, the information based on the collected sound may be information indicating the pattern. In a case where an encoded signal is superimposed on the collected sound, the information based on the collected sound may be the encoded signal itself, information obtained through an arithmetic operation of the encoded signal with a predetermined algorithm, or the like.

The information transmission unit 212 can transmit the information generated by the sound collection unit 211 based on the collected sound to the information reception unit 112 of the vehicle 11. The transmission can be performed using, for example, a communication system that is mounted in the vehicle 11 as well as the portable authentication terminal 21, such as Bluetooth (Registered Trademark).

As the portable authentication terminal 21, a wearable device that is mounted in an earhole of a user or a wearable device that is mounted on a wrist of a user can be applied. In the wearable device that is mounted in the earhole of the user, a sound is generated toward an eardrum, and earhole authentication for specifying an individual from a frequency characteristic of a sound reflected from the eardrum is performed. In the wearable device that is mounted on the wrist of the user, voice authentication, fingerprint authentication, vein authentication, or the like with a sensor provided on a board is performed.

Operation with Control System for Vehicle

Figure 4:
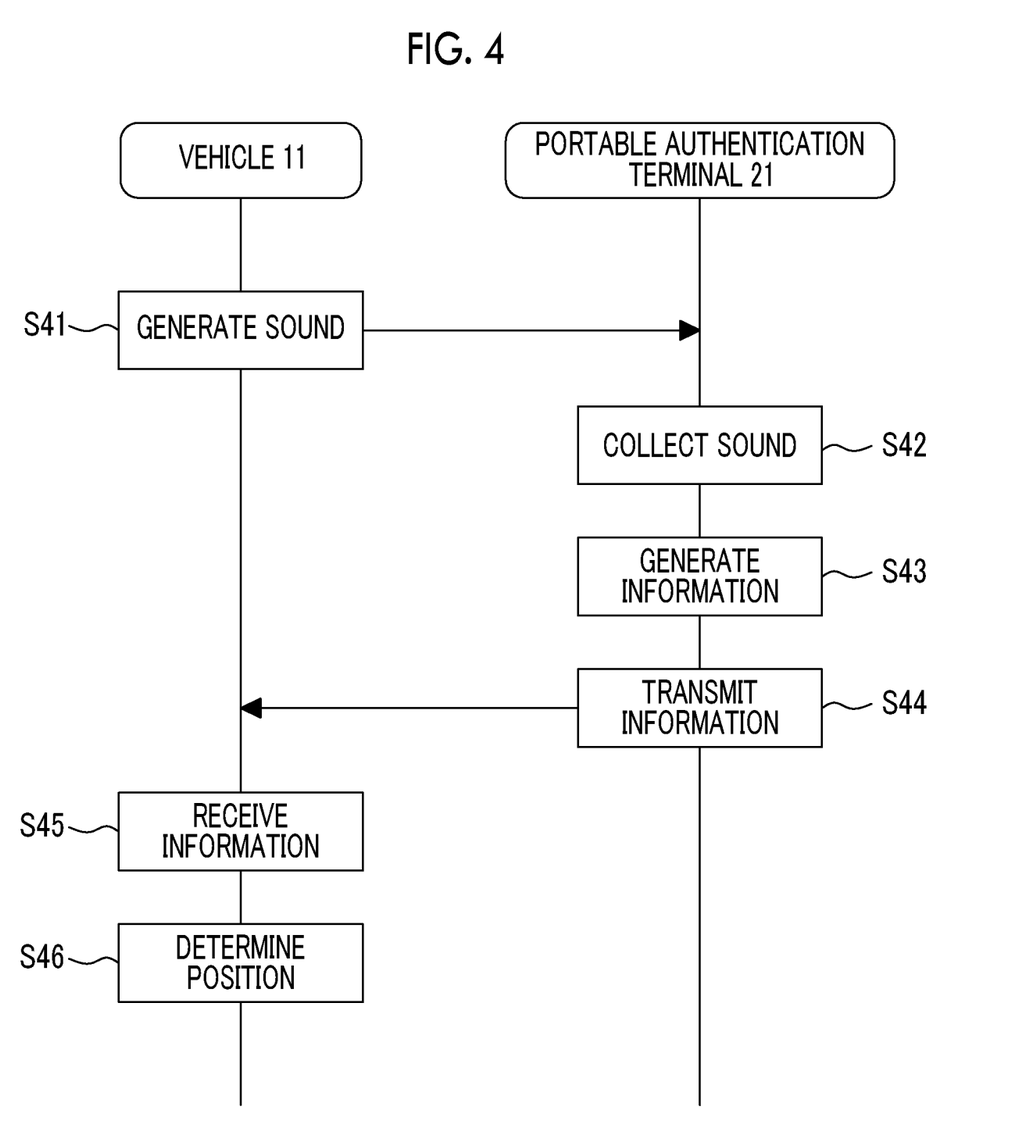
FIG. 4 shows a processing sequence that the control system for a vehicle according to the first embodiment executes.

Processing that the control system 1 for a vehicle according to the first embodiment performs will be described. FIG. 4 shows a processing sequence that the control system 1 for a vehicle executes. The processing is triggered and started, for example, in a case where there is a need of authentication for starting an engine between the vehicle 11 and the portable authentication terminal 21, in a case where a door of the vehicle is closed, or the like.

Step S41: The sound generation unit 111 of the vehicle 11 generates the predetermined sound within the vehicle cabin. The sound to be generated is a monotonous sound, a pattern sound, a sound with an encoded signal superimposed thereon, the sounds, or the like agreed in advance with the portable authentication terminal 21.

Step S42: The sound collection unit 211 of the portable authentication terminal 21 collects a sound around the terminal. The sound collection unit 211 can capture and collect a sound generated by the sound generation unit 111 in a case where the portable authentication terminal 21 is within the vehicle cabin.

Step S43: The sound collection unit 211 of the portable authentication terminal 21 generates information based on the collected sound. The sound collection unit 211 generates one of information based on the sound generated by the sound generation unit 111 and information based on a sound other than the sound generated by the sound generation unit 111. The portable authentication terminal 21 itself may be configured to be able to determine in Step S43 that the portable authentication terminal 21 is within the vehicle cabin of the vehicle 11.

Step S44: The information transmission unit 212 of the portable authentication terminal 21 transmits the information based on the collected sound generated by the sound collection unit 211 to the vehicle 11.

Step S45: The information reception unit 112 of the vehicle 11 receives the information based on the collected sound transmitted from the information transmission unit 212 of the portable authentication terminal 21.

Step S46: The determination unit 113 of the vehicle 11 determines the position of the portable authentication terminal 21, that is, whether or not the portable authentication terminal 21 is within the vehicle cabin based on the information based on the collected sound received from the information transmission unit 212 of the portable authentication terminal 21 by the information reception unit 112.

In regard to the authentication between the vehicle 11 and the portable authentication terminal 21, after the vehicle 11 determines in Step S46 that the portable authentication terminal 21 is within the vehicle cabin, the vehicle 11 may request the portable authentication terminal 21 to transmit an authentication code. In regard to the authentication between the vehicle 11 and the portable authentication terminal 21, after the portable authentication terminal 21 itself determines in Step S42 that the portable authentication terminal 21 is within the vehicle cabin, an authentication code may be transmitted from the portable authentication terminal 21 to the vehicle 11.

Functional Effects of First Embodiment

With the control system 1 for a vehicle according to the first embodiment of the disclosure described above, the predetermined sound is generated within the vehicle cabin on the vehicle 11, and in a case where the portable authentication terminal 21 can capture the predetermined sound, determination is made that the portable authentication terminal 21 is within the vehicle cabin. With this, it is possible to determine whether or not the portable authentication terminal 21 is within the vehicle cabin with high accuracy.

In the control system 1 for a vehicle according to the first embodiment, a sound of a predetermined pattern may be generated within the vehicle cabin, a predetermined encoded signal may be superimposed on a sound, or the sounds having different characteristics, such as sound intensity or frequency, may be generated, and the determination unit may determine whether or not the sound captured by the portable authentication terminal 21 corresponds to the predetermined pattern, the predetermined encoded signal, or the sounds. With this, it is possible to determine whether or not the portable authentication terminal 21 is within the vehicle cabin with higher accuracy.

Second Embodiment

Figure 5:
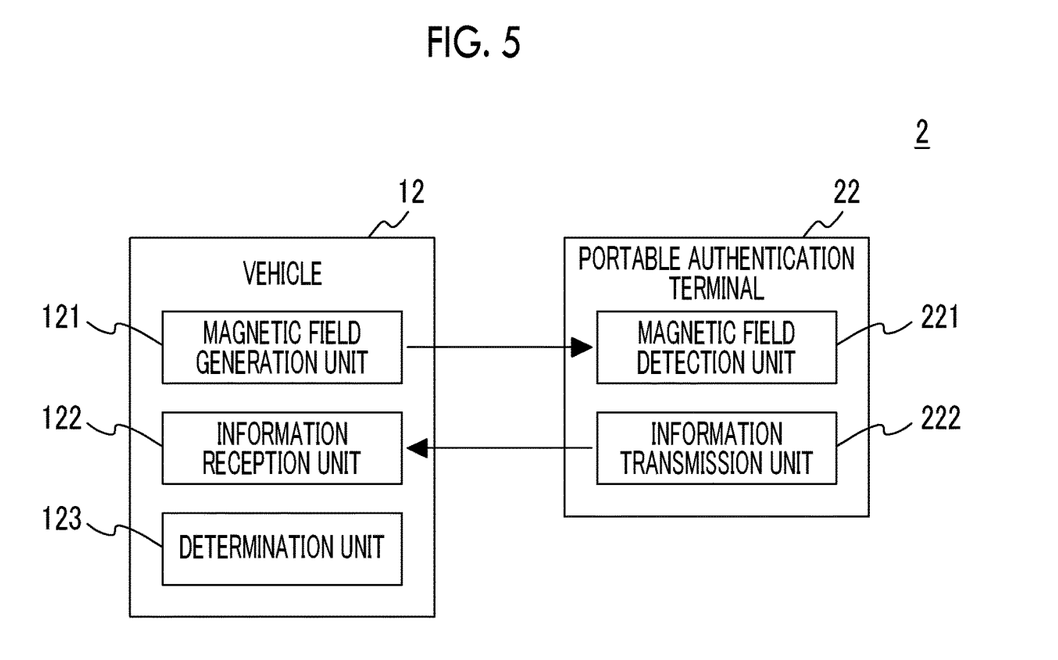
FIG. 5 is a diagram showing the configuration of a control system for a vehicle according to a second embodiment.

FIG. 5 is a diagram showing the configuration of a control system 2 for a vehicle according to a second embodiment. The control system 2 for a vehicle shown in FIG. 5 has a magnetic field generation unit 121, an information reception unit 122, and a determination unit 123 provided in a vehicle 12, and a magnetic field detection unit 221 and an information transmission unit 222 provided in a portable authentication terminal 22.

Configuration of Vehicle

Figure 6:
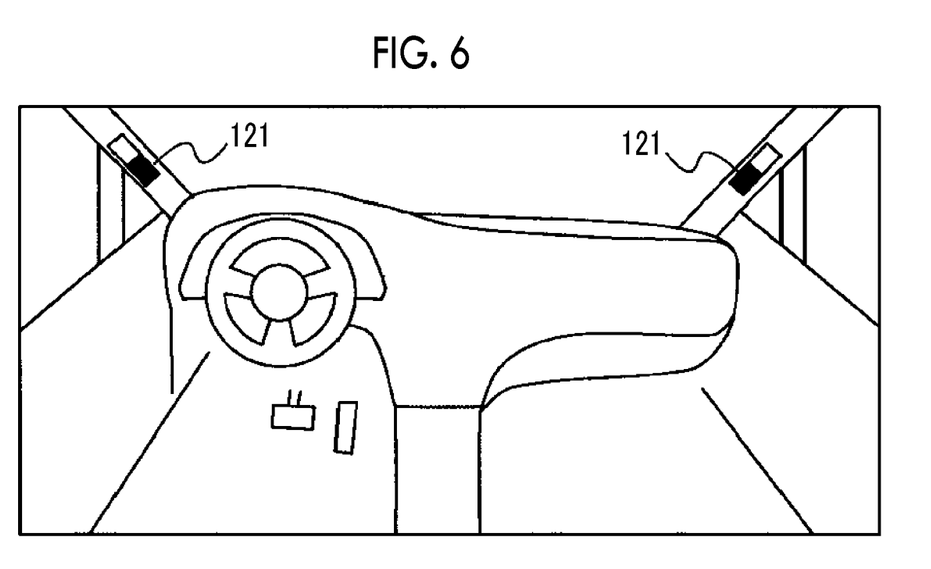
FIG. 6 shows an installation example of a magnetic field generation unit within the vehicle cabin of the vehicle.

The magnetic field generation unit 121 can generate a predetermined magnetic field of a vehicle cabin of the vehicle 11. As the magnetic field generation unit 121, for example, as shown in FIG. 6, permanent magnets, magnetized members, or the like disposed in right and left pillar parts (for example, A-pillar) of the vehicle 12 can be used. In a case where the permanent magnets, the magnetized members, or the like are used, it is possible to generate a static magnetic field within the vehicle cabin.

Figure 7:
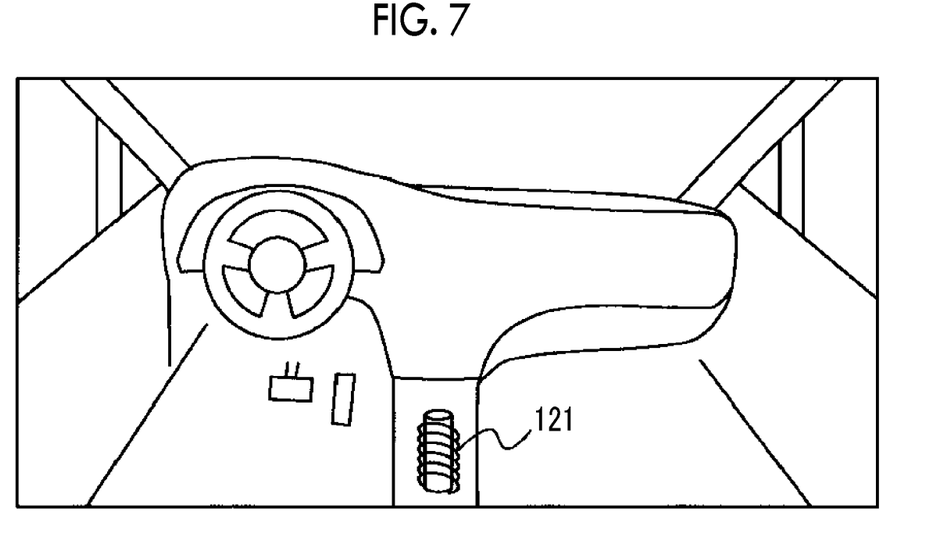
FIG. 7 shows another installation example of the magnetic field generation unit within the vehicle cabin of the vehicle.

As the magnetic field generation unit 121, for example, as shown in FIG. 7, an electromagnet or the like disposed in a center console of the vehicle 12 can be used. In a case where the electromagnet is used, a current of one direction intermittently is made to flow in a coil wound around an iron core (ON/OFF) or the magnitude or direction of a current flowing in the coil is switched at a predetermined timing, whereby it is possible to generate a magnetic field of a predetermined pattern changing in a time domain.

In a case where a stable predetermined static magnetic field can be generated within the vehicle cabin with a magnetized metal body of the vehicle 12, separate components, such as the permanent magnets or the electromagnet described above, are not used, and the vehicle body itself of the vehicle 12 may become the magnetic field generation unit 121.

The information reception unit 122 can receive predetermined information transmitted from the information transmission unit 222 of the portable authentication terminal 22 described below. In regard to the reception, the same communication system as a communication system to be used for information transmission in the portable authentication terminal 22 described below can be used.

The determination unit 123 determines whether or not the portable authentication terminal 22 is within the vehicle cabin based on the information received by the information reception unit 122. Specifically, the determination unit 123 determines that the portable authentication terminal 22 is within the vehicle cabin in a case where the information received by the information reception unit 122 is information based on the magnetic field generated by the magnetic field generation unit 121. The determination unit 123 determines that the portable authentication terminal 22 is outside the vehicle cabin in a case where the information received by the information reception unit 122 is information other than the information based on the magnetic field generated by the magnetic field generation unit 121. For example, the determination unit 123 may store a magnetic field map relating to the magnetic field generated by the magnetic field generation unit 121 in advance, and may determine the relationship between the magnetic field of the information received by the information reception unit 122 and the magnetic field map.

For example, in a case where the magnetic field generation unit 121 generates a magnetic field of a predetermined pattern, the determination unit 123 determines whether or not the information received by the information reception unit 122 corresponds to the pattern. The determination unit 123 determines that the portable authentication terminal 22 is within the vehicle cabin in a case where the information received by the information reception unit 122 corresponds to the pattern, and determines that the portable authentication terminal 22 is outside the vehicle cabin in a case where the information received by the information reception unit 122 does not correspond to the pattern.

A part of the magnetic field generation unit 121, the information reception unit 122, and the determination unit 123 described above can be typically constituted as an electronic control unit (ECU) including a CPU, a memory, an input/output interface, and the like. In the electronic control unit, the CPU reads and executes a predetermined program stored in the memory, whereby a predetermined function is realized.

Configuration of Portable Authentication Terminal

The magnetic field detection unit 221 can detect a magnetic field environment of the portable authentication terminal 22. As the magnetic field detection unit 221, for example, a magnetic field sensor can be used. The detection of the magnetic field may be performed solely once or may be performed multiple times at a predetermined timing. In a case where the magnetic field is detected multiple times, it is possible to more accurately ascertain the position of the portable authentication terminal 22 (for example, until the user enters the vehicle cabin and sits on the driver's seat). The magnetic field detection unit 221 generates information based on the detected magnetic field.

The information based on the detected magnetic field may be, for example, the detected magnetic field itself. In a case where the detected magnetic field has a pattern, the information based on the detected magnetic field may be information indicating the pattern. In a case where there is a plurality of magnetic fields, the information based on the detected magnetic field may be information indicating a state of a combined space with the magnetic fields or a state at the time of movement among the magnetic fields.

The information transmission unit 222 can transmit the information based on the detected magnetic field generated by the magnetic field detection unit 221 to the information reception unit 122 of the vehicle 12. The transmission can be performed using, for example, a communication system that is mounted in the vehicle 12 as well as the portable authentication terminal 22, such as Bluetooth.

As the portable authentication terminal 22, a wearable device that is mounted in an earhole of the user or a wearable device that is mounted on a wrist of the user can be applied. The wearable device is often provided with a high-accuracy magnetic field sensor, such as a sensor that can measure terrestrial magnetism for the purpose of detecting an azimuth of walking (traveling). Accordingly, the magnetic field sensor can be used as the magnetic field detection unit 221.

Operation with Control System for Vehicle

Figure 8:
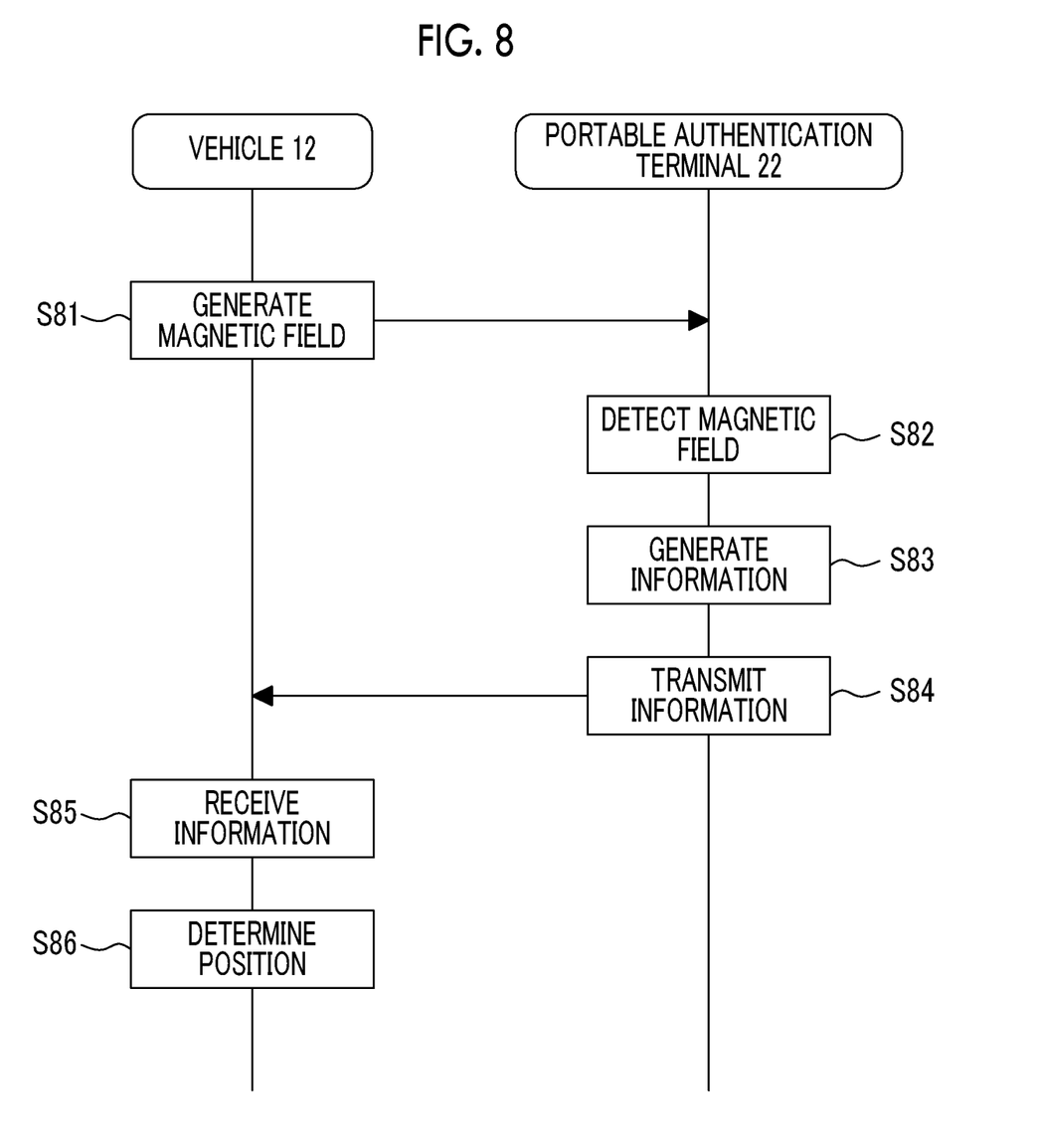
FIG. 8 shows a processing sequence that the control system for a vehicle according to the second embodiment executes.

Processing that the control system 2 for a vehicle according to the second embodiment will be described. FIG. 8 shows a processing sequence that the control system 2 for a vehicle executes. The processing is triggered and started, for example, in a case where there is a need of authentication for starting an engine between the vehicle 12 and the portable authentication terminal 22, in a case where a door of the vehicle is closed, or the like.

Step S81: The magnetic field generation unit 121 of the vehicle 12 generates the predetermined magnetic field within the vehicle cabin. The magnetic field to be generated is a single magnetic field, the magnetic fields, a pattern magnetic field, or the like agreed in advance with the portable authentication terminal 22.

Step S82: The magnetic field detection unit 221 of the portable authentication terminal 22 detects the magnetic field environment of the portable authentication terminal 22. The magnetic field detection unit 221 can detect the magnetic field generated by the magnetic field generation unit 121 in a case where the portable authentication terminal 22 is within the vehicle cabin.

Step S83: The magnetic field detection unit 221 of the portable authentication terminal 22 generates information based on the detected magnetic field. The magnetic field detection unit 221 generates one of information based on the magnetic field generated by the magnetic field generation unit 121 or information based on a magnetic field other than the magnetic field generated by the magnetic field generation unit 121. The portable authentication terminal 22 may be configured to be able to determine in Step S83 that the portable authentication terminal 22 is within the vehicle cabin of the vehicle 12.

Step S84: The information transmission unit 222 of the portable authentication terminal 22 transmits the information based on the detected magnetic field generated by the magnetic field detection unit 221 to the vehicle 12.

Step S85: The information reception unit 122 of the vehicle 12 receives the information based on the detected magnetic field transmitted from the information transmission unit 222 of the portable authentication terminal 22.

Step S86: The determination unit 123 of the vehicle 12 determines the position of the portable authentication terminal 22, that is, whether or not the portable authentication terminal 22 is within the vehicle cabin based on the information based on the detected magnetic field received from the information transmission unit 222 of the portable authentication terminal 22 by the information reception unit 122.

In regard to the authentication between the vehicle 12 and the portable authentication terminal 22, after the vehicle 12 determines in Step S86 that the portable authentication terminal 22 is within the vehicle cabin, the vehicle 12 may request the portable authentication terminal 22 to transmit an authentication code. In regard to the authentication between the vehicle 12 and the portable authentication terminal 22, after the portable authentication terminal 22 itself determines in Step S82 that the portable authentication terminal 22 is within the vehicle cabin, an authentication code may be transmitted from the portable authentication terminal 22 to the vehicle 12.

Functional Effects of Second Embodiment

With the control system 2 for a vehicle according to the second embodiment of the disclosure, a predetermined magnetic field is generated within the vehicle cabin on the vehicle 12 side, and in a case where the portable authentication terminal 22 can detect the predetermined magnetic field, determination is made that the portable authentication terminal 22 is within the vehicle cabin. With this, it is possible to determine whether or not the portable authentication terminal 22 is within the vehicle cabin with high accuracy.

In the control system 2 for a vehicle according to the second embodiment, a magnetic field of a predetermined pattern or the magnetic fields may be generated within the vehicle cabin, and the determination unit may determine whether or not the magnetic field detected by the portable authentication terminal 22 corresponds to the predetermined pattern or the magnetic fields. With this, it is possible to determine whether or not the portable authentication terminal 22 is within the vehicle cabin with higher accuracy.

A high-sensitivity magnetic field sensor embedded in a wearable device or the like is considered to be able to detect a magnetic field (detect just the presence or absence of a magnetic field) by receiving a low frequency signal of about several Hz to 100 kHz. For example, a low frequency magnetic field signal antenna (an LF transmission antenna for smart communication, or the like) that is originally mounted within the vehicle cabin of the vehicle 12 is applied to the magnetic field generation unit 121 as a configuration capable of generating a predetermined magnetic field using an electric wave, and a low frequency magnetic field signal of about several Hz to 100 kHz is sent from the magnetic field signal antenna, whereby it may be possible to determine whether or not the portable authentication terminal 22 is within the vehicle cabin.

In this case, more preferably, a low frequency magnetic field signal subjected to ON/OFF control (Amplitude Shift Keying (ASK)) encoding) is transmitted from the magnetic field signal antenna (magnetic field generation unit 121) of the vehicle 12, and the magnetic field sensor (the magnetic field detection unit 221 of the portable authentication terminal 22) of the wearable device decodes the received low frequency magnetic field signal. With this, it is possible to allow the magnetic field sensor to more accurately verify that the magnetic field sensor captures the low frequency magnetic field signal transmitted from the magnetic field signal antenna.

The control system for a vehicle of the disclosure is useful in a case where a vehicle operation is performed through authentication with a vehicle is performed using a portable authentication terminal carried with an authorized user other than an electronic key dedicated to the vehicle.

What is claimed is:

1. An apparatus installed in a vehicle, which communicates with a portable authentication terminal, the apparatus comprising:
   a sound control unit that is executable by at least one processor and configured to control a sound device of the vehicle comprising a speaker to produce a sound generated on the basis of a predetermined pattern in a vehicle cabin of the vehicle;
   a reception unit that is executable by the at least one processor and configured to receive information transmitted from the portable authentication terminal; and
   a determination unit that is executable by the at least one processor and configured to determine that the portable authentication terminal is within the vehicle cabin based on the information received by the reception unit indicating that the sound was received by the portable authentication terminal within the vehicle cabin.

2. The apparatus installed in a vehicle according to claim 1, wherein,
   in a case where the information received by the reception unit corresponds to the predetermined pattern, the portable authentication terminal is determined to be within the vehicle cabin, and in a case where the information received by the reception unit does not correspond to the predetermined pattern, the portable authentication terminal is determined to not be within the vehicle cabin.

3. The apparatus installed in a vehicle according to claim 1, wherein the sound control unit controls the sound device of the vehicle to produce a plurality of sound having different characteristics.

4. The apparatus installed in a vehicle according to claim 3, wherein the sounds are different in one of sound intensity and frequency.

5. The apparatus installed in a vehicle according to claim 1, wherein the portable authentication terminal is a wearable device that is mounted in an earhole of the user.

6. The apparatus installed in a vehicle according to claim 1, wherein the portable authentication terminal is a wearable device that is mounted on a wrist of the user.

7. An apparatus installed in a vehicle which communicates with a portable authentication terminal comprising:

a magnetic field generation unit comprising a magnet configured to generate a magnetic field on the basis of a predetermined pattern within a vehicle cabin of the vehicle;

a reception unit comprising a receiver configured to receive information transmitted from the portable authentication terminal, and a determination unit comprising a processor configured to determine that the portable authentication terminal is within the vehicle cabin based on the information received by the reception unit is information based on the magnetic field generated in the vehicle cabin of the vehicle.

8. The apparatus installed in a vehicle according to claim 7, wherein in a case where the information received by the reception unit corresponds to the predetermined pattern, the portable authentication terminal is determined to be within the vehicle cabin, and in a case where the information received by the reception unit does not correspond to the predetermined pattern, the portable authentication terminal is determined to not be within the vehicle cabin.

9. The apparatus installed in a vehicle according to claim 7, wherein the determination unit comprises a magnetic field map within the vehicle cabin, the magnetic field map relating to the magnetic field generated by the magnetic field generation unit; and the determination unit is configured to determine whether or not the portable authentication terminal is within the vehicle cabin based on the information received by the reception unit and the magnetic field map.

10. The apparatus installed in a vehicle according to claim 7, wherein the magnetic field generation unit is mounted on a pillar part of the vehicle.

11. The apparatus installed in a vehicle according to claim 7, wherein in that the authentication terminal is a wearable device that is mounted in an earhole of the user.

12. The apparatus installed in a vehicle according to claim 7, wherein in that the authentication terminal is a wearable device that is mounted on a wrist of the user.

13. A system comprising:

an apparatus installed in a vehicle and comprising a processor that is configured to:

control a sound device of the vehicle comprising a speaker to produce a sound generated on the basis of a predetermined pattern in a vehicle cabin of the vehicle;

receive information transmitted from the portable authentication terminal, and determine whether a portable authentication terminal is within the vehicle cabin based on the information received, the portable authentication terminal which communicates with the apparatus and is configured to:

collect the sound, and transmit information based on the sound collected by the sound collector to the apparatus, wherein the processor is further configured to determine that the portable authentication terminal is within the vehicle cabin based on whether the information received is information based on the sound generated.

14. A system comprising:

a portable authentication terminal; and an apparatus comprising a processor, the apparatus being installed in a vehicle and being configured to:

generate a magnetic field on the basis of a predetermined pattern within a vehicle cabin of the vehicle;

receive information transmitted from the portable authentication terminal; and determine whether the portable authentication terminal is within the vehicle cabin based on the information received by a receiver; and wherein the apparatus is configured to communicate with the portable authentication terminal and is configured to:

detect the magnetic field; and transmit information based on the magnetic field detected to the apparatus, wherein the processor is further configured to determine that the portable authentication terminal is within the vehicle cabin based on whether the information received is information based on the predetermined pattern of the magnetic field generated.

* * * * *